(12) United States Patent
Mao et al.

(10) Patent No.: US 7,016,104 B2
(45) Date of Patent: Mar. 21, 2006

(54) WIDER DYNAMIC RANGE TO A FBG STABILIZED PUMP

(75) Inventors: Erji Mao, Campbell, CA (US); Stuart MacCormack, Mountain View, CA (US); Greg Roth, Santa Ana, CA (US); Steven Sanders, Belmont, CA (US)

(73) Assignee: JDS Uniphase Corporation, San Jose, CA (US)

( * ) Notice: Subject to any disclaimer, the term of this patent is extended or adjusted under 35 U.S.C. 154(b) by 301 days.

(21) Appl. No.: 10/610,510

(22) Filed: Jun. 30, 2003

(65) Prior Publication Data

US 2004/0036956 A1   Feb. 26, 2004

Related U.S. Application Data

(60) Provisional application No. 60/392,298, filed on Jul. 1, 2002.

(51) Int. Cl.
*H01S 3/00* (2006.01)
(52) U.S. Cl. ....................................... 359/334
(58) Field of Classification Search ................. 359/334
See application file for complete search history.

(56) References Cited

U.S. PATENT DOCUMENTS

| | | | |
|---|---|---|---|
| 5,477,368 A | 12/1995 | Eskildsen et al. | 359/188 |
| 5,499,135 A | 3/1996 | Heidemann et al. | 359/341 |
| 5,907,420 A | 5/1999 | Chraplyvy et al. | 359/179 |
| 6,215,809 B1 | 4/2001 | Ziari et al. | 372/96 |
| 6,240,119 B1 | 5/2001 | Ventrudo | 372/96 |
| 6,331,908 B1 | 12/2001 | Adams et al. | 359/188 |
| 6,373,621 B1 | 4/2002 | Large et al. | 359/334 |
| 6,452,716 B1 | 9/2002 | Park et al. | 359/334 |
| 6,456,408 B1 | 9/2002 | Moeller | 359/124 |
| 6,456,426 B1 | 9/2002 | Bolshtyansky et al. | 359/334 |
| 6,516,113 B1 | 2/2003 | Glingener et al. | 385/24 |
| 6,611,368 B1 * | 8/2003 | Grant et al. | 359/334 |
| 6,748,136 B1 * | 6/2004 | Headley et al. | 385/27 |
| 6,844,961 B1 * | 1/2005 | Odate et al. | 359/334 |
| 2003/0095745 A1 | 5/2003 | Gehlot | 385/31 |

FOREIGN PATENT DOCUMENTS

EP   1 079 481 A2   2/2001

OTHER PUBLICATIONS

U.S. Appl. No. 10/269,925, filed Oct. 11, 2002, "Method for Increasing Dynamic Range of Erbium Doped Fiber Amplifiers", Ratoff et al.

* cited by examiner

*Primary Examiner*—Mark Hellner
(74) *Attorney, Agent, or Firm*—Allen, Dyer, Doppelt, Milbrath & Gilchrist, P.A.

(57) ABSTRACT

The present application relates to a Raman amplifier having an increased dynamic range, and particularly for laser pump sources and a method of pumping Raman fiber amplifiers over a greater dynamic range. In a multi-channel optical system, optical amplifiers must be able to provide gains over a large dynamic range, which is determined by the distribution of node-to-node distances in the network, as well as the number of channels. The present invention has found that the dynamic range of a Raman amplifier can be significantly increased by using pulse width modulation to pulse pump current at or near the minimum current stability threshold, in order to produce lower power output. The duty cycle of the pulsed current is selected to achieve a time-averaged operating condition, thus the time averaged pump power can be reduced in a linear fashion well below the capability of a continuous wave system.

28 Claims, 3 Drawing Sheets

WIDER DYNAMIC RANGE TO A FBG STABILIZED PUMP

CROSS-REFERENCE TO RELATED APPLICATIONS

This application claims priority from U.S. provisional application Ser. No. 60/392,298 filed Jul. 1, 2002.

MICROFICHE APPENDIX

Not Applicable.

TECHNICAL FIELD

The present application relates to fiber Bragg grating (FBG) stabilized pumps, and in particular, to a wide dynamic range FBG stabilized laser pump source and a Raman optical amplifier utilizing the same.

BACKGROUND OF THE INVENTION

Optical networks increasingly use wavelength division multiplexing (WDM) as a method to increase bandwidth. Multiple optical channels are combined and transmitted simultaneously as a single multiplexed signal. At the receiving end a demultiplexer separates the channels by wavelength and routes individual channels.

Optical amplifiers are commonly used in optical communication systems as in-line amplifiers for boosting signal levels to compensate for losses in a transmission link. In WDM systems, optical amplifiers are particularly useful because of their ability to amplify many optical channels simultaneously. For example, rare earth doped fiber optical amplifiers, such as erbium doped fiber amplifiers (EDFAs), semiconductor optical amplifiers (SOAs) and/or Raman optical amplifiers (ROAs) are used extensively for these purposes.

ROAs show potential over some of the other optical amplifiers in that they exhibit a high transparency when not pumped, because they can utilize silica-based fiber as a gain medium, and because they are suitable across the entire optical communication transmission window of silica optical fibers.

ROAs are typically referred to as either distributed Raman amplifiers, wherein the gain medium is part of the transmission fiber, or discrete Raman amplifiers, wherein the gain medium is a coil of optical fiber. In both amplification systems, the ROA includes a pump source for launching a pump beam into the gain medium. Raman gain is achieved through stimulated Raman scattering (SRS), which is an inelastic scattering process in which an incident pump photon loses its energy to create another photon of reduced energy at a lower frequency. The remaining energy is absorbed by the fiber medium in the form of molecular vibrations.

ROAs are typically designed to have a dynamically adjustable output power level. In particular, using a pump with a dynamically adjustable output power level allows a ROA to maintain constant gain for optical signals whose powers and numbers vary due to switching and routing, network reconfigurations, failures, and/or recovery from failures.

The dynamic range of a ROA pump is of particular importance in dynamically reconfigurable networks, where signal channels are re-routed in real time between any two nodes within the network. This requires an ROA at each node to be able to provide a large dynamic gain range. For example, consider a fiber span between node A and node B with 20 dB loss over about 100 km. During normal operation, signal channels are transmitted from node A to node B and an ROA at node B provides 17 dB of on-off gain. When a demand occurs, the network is reconfigured to handle signal transmission from node C to node B where the fiber loss is only 3.5 dB over about 17 km. In this case, in order to keep the signal level at node B constant, the Raman amplifier should only provide 0.5 dB of on-off gain. This corresponds to a required pump power dynamic range of more than 15 dB.

In addition, the dynamic range of a ROA pump is important when used in ROAs having multiple pump sources. Multiple pump sources are frequently used in ROAs to increase the bandwidth and/or generate a relatively flat gain curve. In particular, two or more pump sources are used frequently to provide pump energy at two or more pump wavelengths such that a relatively flat composite gain spectrum is obtained. In some instances, it is necessary for one or more of these pump sources to be operated at low, or very low, pump power levels. For example, if a large number of pump sources is used, the pump power of each pump source will need to be reduced accordingly. Alternatively, low power levels are used to provide slight shifts in the gain curve from at least one of the pump sources.

Unfortunately, most ROA pump sources are fiber Bragg grating (FBG) stabilized semiconductor diode lasers and are not typically designed to provide a large dynamic range and/or to operate at low powers. In particular, the ROA pump sources typically have associated therewith a minimum operating power level, below which, grating stabilization of the lapsing wavelength may not occur, or may become unstable, causing wavelength and power fluctuation.

Grating stabilization occurs when light is fed back into the laser, for example from a fiber Bragg grating (FBG), so as to perturb the coherent optical field formed in the diode laser cavity. This perturbation interrupts the coherence of the laser emission, which is referred to as coherence collapse, broadening the bandwidth of the laser emission by several orders of magnitude and resulting in multiple longitudinal mode operation of the laser source.

Advantageously, grating stabilization effectively locks the laser cavity output to the fixed wavelength of the grating and centers the external cavity multi-longitudinal modes around that wavelength, and thus fluctuations in wavelength of the laser source, such as those caused by changes in temperature or current, are eliminated. In addition, grating stabilization reduces the magnitude of mode-hopping noise in the laser (due to the presence of the multi-longitudinal modes), reduces perturbations from extraneous optical feedback from reflective components located beyond the grating, and permits the laser to deliver high optical powers into the fiber without the onset of stimulated Brilloum scattering (SBS).

Unfortunately, when grating stabilization fails (such as below the minimum power level discussed above) the laser will fall back into single longitudinal mode, and the majority of the light provided by the laser will be reflected back from the transmission fiber through SBS. In other words, the dynamic range of a FBG stabilized ROA pump is limited, at least at the lower end, by the minimum power level needed to maintain coherence collapse of the laser.

In U.S. patent application Ser. No. 10/269,925 filed Oct. 11, 2002, hereby incorporated by reference, Ratoff et al. disclose a method of increasing the dynamic range of pump sources used in rare-earth doped amplifiers, such as erbium doped fiber amplifiers (EDFAs). In particular, Ratoff et al. teach a method of modulating an EDFA pump source via pulse width modulation. The purpose of this modulation is to extend the dynamic range of the EDFA pump source such that channel dropping/adding does not significantly affect the EDFA's power output for each channel. Notably, this problem is more significant for EDFAs than for ROAs because EDFAs are more easily saturated.

In the prior art, modulated (or dithered) pump sources have been also proposed for use in rare-earth doped amplifiers to remove kinks from power versus current curves (see U.S. Pat. No. 6,240,119 hereby incorporated by reference), decrease susceptibility to feedback (see U.S. Pat. No. 5,499,135 hereby incorporated by reference), remove undesirable perturbations in the laser source output (see U.S. Pat. No. 6,215,809, hereby incorporated by reference), and allow the generation and launching of higher than expected power optical signals without experiencing the effects of SBS (see U.S. Pat. No. 5,477,368 and, for comparison, U.S. Pat. Nos. 6,331,908 and 6,516,113, hereby all incorporated by reference).

Notably, none of these references propose a system or method for improving the dynamic range of Raman pumps, which for example, needs to be increased due to the dynamic routing of signal wavelengths, and/or using low pump powers, which for example, is useful when using multiple pumps.

Modulated pumps, however, have been used in Raman amplifiers to reduce pump interactions in the fiber arising from the use of two different pumps (see U.S. Pat. No. 6,456,426 hereby incorporated by reference), to provide a closed loop control by providing a small amount of low frequency modulation to the pump (see U.S. Pat. Nos. 6,373,621 and 6,452,716 hereby both incorporated by reference), and to provide a degree of randomness to the pump signal to minimize cross talk between signals and improve the transfer of power from the pump to the signal (see U.S. patent application Ser. No. 09/990,206 filed Nov. 21, 2001).

It is an object of the instant invention to provide a Raman amplifier having an improved dynamic range.

It is a further object of the instant invention to provide a FBG stabilized pump laser source for a Raman amplifier that has a broad range of output power.

It is yet another object of the instant invention to provide a FBG stabilized pump laser source for a Raman amplifier that can provide stable output at very low power levels.

SUMMARY OF THE INVENTION

The present invention relates to the fact that the dynamic range of a grating stabilized pump laser for use in a Raman amplifier is significantly increased by modulating the pump. In particular, it has been found that using pulse width modulation to pulse pump current at or near the minimum current stability threshold of the pump, produces lower power output and thus increases the dynamic range of the Raman pump. The duty cycle of the pulsed current is selected to achieve a time-averaged operating condition, and thus the time averaged pump power can be reduced in a linear fashion well below the capability of a continuous wave (CW) system.

Accordingly, the present invention provides a method of amplifying an optical signal comprising the steps of: transmitting the optical signal through a section of optical fiber; pumping the optical fiber with a pump signal having a wavelength band and power level sufficient to produce Raman gain within a predetermined band of wavelengths including at least one signal wavelength of the optical signal; modulating the pump signal in dependence on a desired average pump signal power.

Accordingly, the present invention provides a method of pumping an optical amplifier having a section of optical fiber for receiving and amplifying an optical signal, the method comprising the steps of: providing a grating stabilized pump laser for providing a pump signal to the optical fiber, the pump signal having a wavelength band and power level sufficient to produce Raman gain on the optical signal; determining a drive current $I_{max}$ of the pump laser for maximum pump power output; determining a drive current $I_{min}$ of the pump laser for minimum stable pump power output; applying a pulsed drive current to the pump laser at least at $I_{min}$ for providing a time averaged pump drive current $I_{ave}$ less than $I_{min}$ while still maintaining stable pump power output; and modifying the pulsed drive current in dependence upon a desired pump power level.

Accordingly, the present invention further provides a Raman optical amplifier comprising: a section of optical fiber for transmitting an optical signal; a pump laser optically coupled to the length of optical fiber, the pump laser for providing a pump signal having a wavelength band and power level sufficient to produce Raman gain within a predetermined band of wavelengths including at least one signal wavelength of the optical signal; and, modulating means coupled to the pump laser, the modulating means for modulating the pump signal in dependence on a desired average pump signal power.

Accordingly, the present invention further provides a Raman pump for pumping a section of optical fiber for transmitting an optical signal, comprising: a pump laser optically coupled to the section of optical fiber, the pump laser for providing a pulsed pump signal having a wavelength band and an average power level sufficient to produce Raman gain for the optical signal; and, a controller coupled to the pump laser, the controller for selecting a pulse width of the pulsed pump signal so as to increase the dynamic range of the pump laser.

Accordingly, the present invention further provides a Raman optical amplifier comprising: a pump laser for optically coupling to a length of optical fiber, the pump laser for operating in a first continuous-wave mode of operation wherein it produces a continuous wave pump signal having a power level between $P_{max}$ and $P_{min}$, and a second modulated mode of operation wherein it produces a modulated pump signal having an average power level below $P_{min}$, wherein $P_{min}$ corresponds to the minimum pump power achievable under stable continuous wave operating conditions; and a controller coupled to the pump laser, the controller for switching between the first and second modes of operation in dependence upon a desired pump power.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
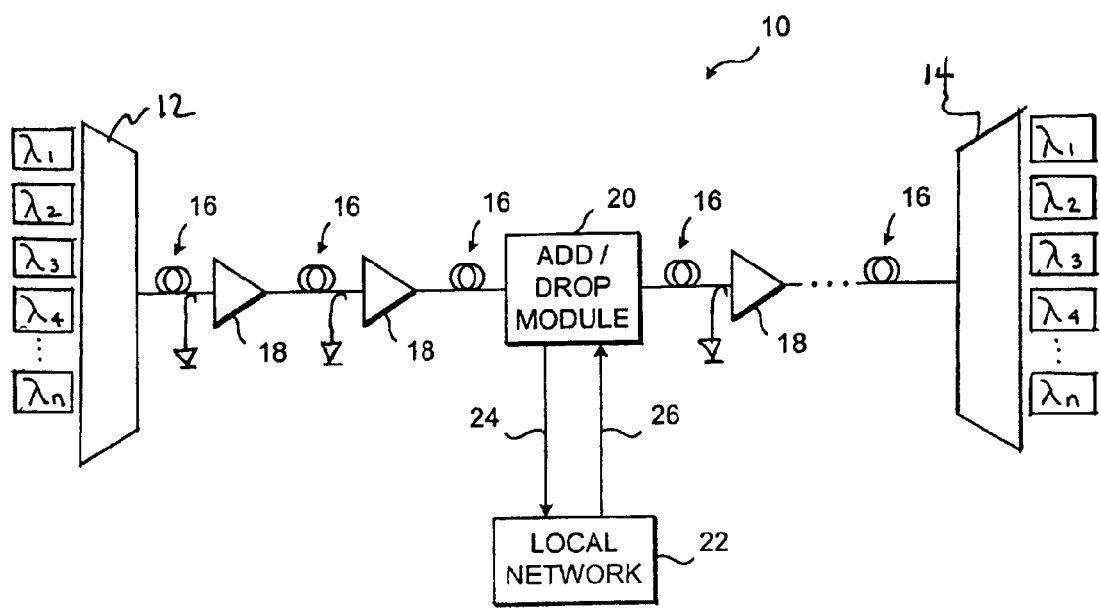
FIG. 1 is a schematic illustration of an optical communications link.

A communications link 10 is shown schematically in FIG. 1. A transmitter 12, including a plurality of laser diodes each of which transmits at a channel operating at a different wavelength, transmits information on all the channels to a receiver 14 over a series of fiber links. Each fiber link includes a span 16 of optical fiber. As the optical signals travel along the optical fibers 16, signal strength is attenuated. Optical amplifiers 18, which for the purposes of the instant invention are Raman optical amplifiers (ROAs), are therefore used to amplify the optical signals between successive spans of fiber.

If one of the laser diodes of the transmitter 12 is taken out of service or if new channels are added, the number of wavelengths being transmitted across link 10 will change abruptly. The number of channels being carried by link 10 may also change due to unexpected system failures, such as fiber cuts. Link 10 also optionally includes add/drop modules, such as add/drop module 20. Module 20 is used to separate channels at certain wavelengths from the main fiber path to connect to a local network 22 over a fiber link 24. Communications traffic from the local network 22 is transmitted to module 20 over fiber link 26. If link 26 is cut accidentally or if the network is reconfigured so that a different number of channels are provided over the fiber span fed by module 20, the number of channels carried by link 10 following the add/drop module 20 will change abruptly.

Figure 2:
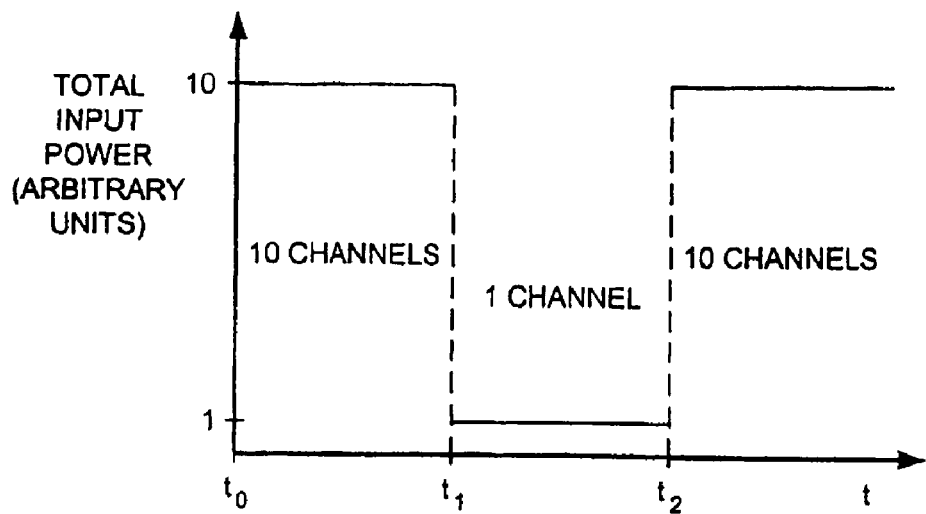
FIG. 2 is a representative graph of total signal power over time.

Referring to FIG. 2, there is shown a graph illustrating how the total signal power carried by a fiber in a link 10 may vary under transient conditions. In the example of FIG. 2, the fiber link is initially carrying ten signal channels. The total input power at a given amplifier 18 of link 10 is therefore relatively constant between time $t_0$ and $t_1$. At time $t_1$, nine of the original channels are dropped. As a result, the total power applied to the input of the amplifier 18 drops to one tenth of its original level. At time $t_2$, the nine dropped channels are restored, so that the system is again handling ten channels. The total input power to the amplifier therefore increases abruptly.

A ROA with a constant pump level will not produce a well controlled output signal in response to such large variations in the input signal level, as discussed above. Accordingly, ROAs frequently use feedback by tapping the signal traffic on the link, monitoring the power levels and providing feedback to the pump controller. Signal power levels may be sampled at input and/or outputs to the amplifier. Alternatively, feedforward schemes are also implemented, which sample input power to the amplifier, anticipating an output gain, and provide changing input levels to a pump controller. Unfortunately, it is becoming more difficult for ROA pumps to meet the dynamic range requirements imposed by advances in technology, such as the so called 'agile networks' of the future (where dynamic routing of signal wavelengths occurs).

Figure 3:
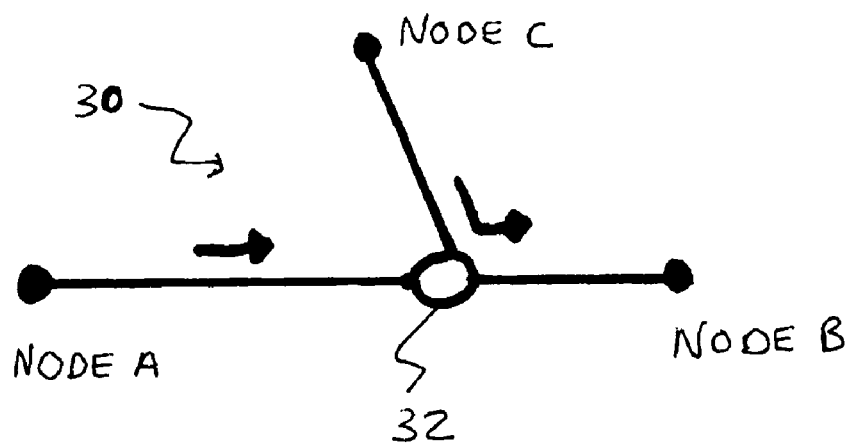
FIG. 3 is schematic illustration of a dynamically reconfigurable network.

Referring to FIG. 3, there is shown a schematic illustration of a dynamically reconfigurable network. The network 30 includes a first node, A, a second node, B, a third node, C, and an optical switch 32. At each node, one or more channels may be added or dropped, thus allowing network architects more flexibility. Unfortunately, this additional flexibility requires a larger dynamic range from the ROAs used within the network, as discussed above. For example, consider the following requirements of a ROA at node B. During normal operation, when signal channels are transmitted from node A to node B, the optical signal propagating through the 100 km long fiber span will experience a 20 dB loss. In this instance the ROA at node B is required to provide a relative large 17 dB of on-off gain. When a demand occurs and the network is reconfigured to handle signal transmission from node C to node B, the optical signal propagating through the 17 km fiber span will experience a fiber loss of only 3.5 dB. In order to keep the signal level at node B constant, the ROA at node B should only provide 0.5 dB of on-off gain. This corresponds to a required pump power dynamic range of over 15 dB. Traditionally, the pump lasers used in Raman amplifiers have output power dynamic ranges below 7 dB.

The present invention has found that the dynamic range of a grating stabilized pump laser for use in a ROA is significantly increased by modulating the pump. In particular, the instant invention has found that modulating the pump reduces the average pump power output from the laser relative to the power obtained in continuous wave (CW) operation (e.g., by reducing some of the pump injection current), yet still maintains stable operation of the laser.

Figure 4:
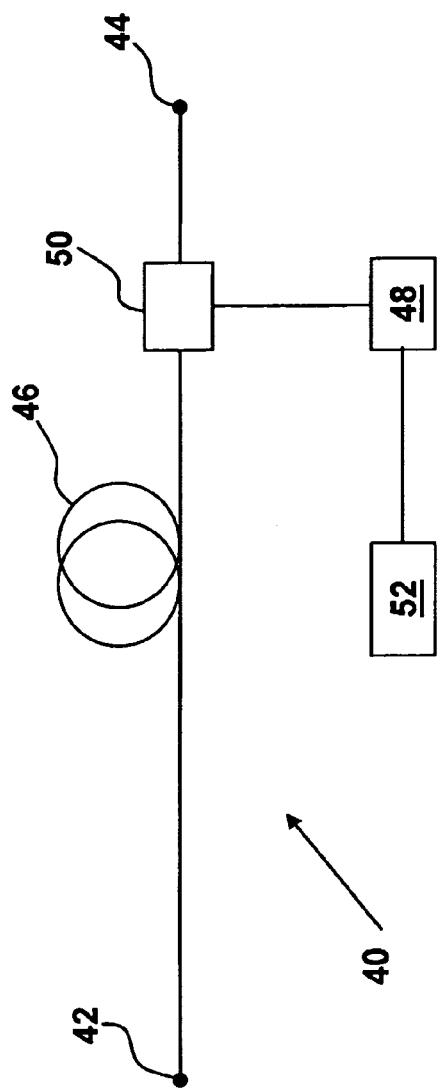
FIG. 4 is a schematic representation of a Raman amplifier in accordance with an embodiment of the instant invention; and, FIG. 5 is a schematic representation of a pulse.

Referring to FIG. 4, there is shown a schematic diagram of a ROA in accordance with the instant invention. The Raman amplifier 40 includes an input 42, an output 44, a length of optical fiber 46, a Raman pump 48, and a pump coupler 50, such as a WDM coupler, for coupling the pump light from the pump 48 into the optical fiber 46. A controller 52 is provided to drive the pump 48.

Although, the ROA 40 is shown as a discrete Raman amplifier that is counter-pumped, the instant invention also includes distributed Raman amplifiers and/or co-propagating pump light. Generally, counter-propagating pump light is associated with lower noise. Preferably, the pump source is a grating stabilized semiconductor laser diode that provides Raman pump light that is approximately a Stokes shift in wavelength below the signal band to be amplified. Optionally, the amplifier 40 includes other components such as taps, dispersion compensation elements, isolators, optical channel monitors, additional Raman pump sources, etc. (not shown), as is well known in the art.

In accordance with the instant invention, the Raman pump 48 is modulated or dithered. For example, in one embodiment the pump 48 includes a semiconductor laser that is driven by a modulated current via controller 52. Suitable pulse shapes for the modulated injection current include square waves, sine waves, triangular waves, and/or other low duty-cycle pulses. In other embodiments, the modulation is effected with a modulated current added to a CW injection current and/or an external modulator. Notably, simple electronic circuitry can be used to create the modulated injection pulses.

Figure 5:
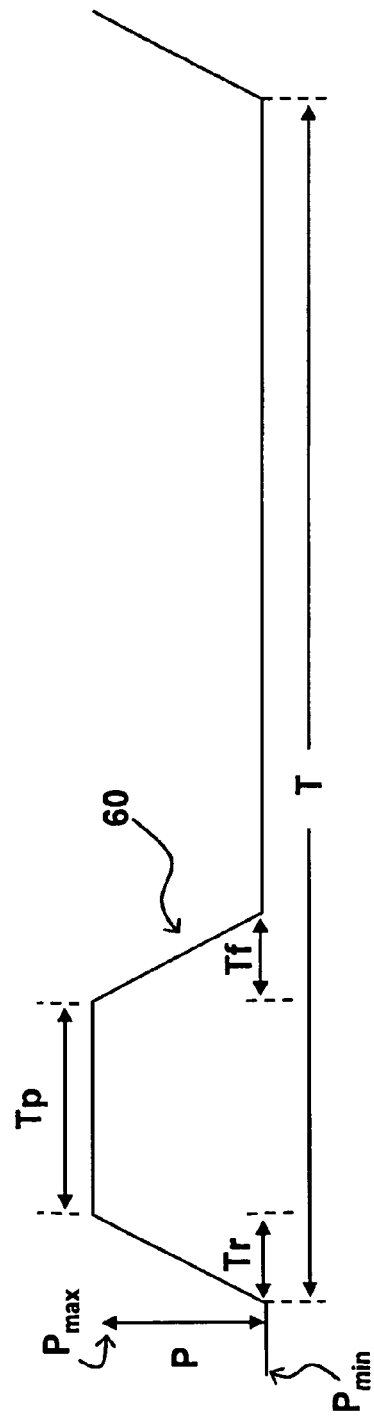

Referring to FIG. 5, there is shown a pulse shape produced by a modulated pump according to one embodiment of the instant invention. The pulse 60, which corresponds to the pump power as a function of time, is characterized by the rise time, $T_r$, the fall time $T_f$, the pulse length, $T_p$, the period of modulation, T, the peak pump power, $P_{max}$, and the minimum pump power, $P_{min}$. The modulation frequency is equal to 1/T. The rise time $T_r$ and the fall time $T_f$ are typically determined by the pump package and the drive electronics.

Preferably, the modulation frequency is sufficiently high to minimize the transfer of pump modulation to the optical signal to be amplified. Notably, the necessary frequency depends on both the modulation depth and the pumping configuration (co-propagating versus counter-propagating). For example, a counter-propagating pump operating at 60 mW (the minimum power limit needed to maintain it in a stable coherence collapse regime), and having a maximum modulation depth of about 100% (i.e., a 60 mW peak-to-peak modulation), was found to require a modulation frequency of approximately 1 MHz. In general, modulation frequencies between 500 kHz and 20 MHz will suffice for most systems.

The average pump power, in pulsed operation, can be expressed as follows:

$$P_{ave} = P_{\min} + (P_{\max} - P_{\min})\left[\frac{0.5T_r + T_p + 0.5T_f}{T}\right]$$

According to this equation, the average pump power of a pump driven to provide 60 mW of power without modulation, can be lowered to 6 mW of power if the modulation depth varies from 0 to 100% (i.e., from 60 to 0 mW), the rise and fall times correspond to 100 ns, the pulse length is negligible, and the modulation frequency is around 1 MHz. Adjusting any of $P_{min}$, $P_{max}$, $T_p$, and T varies the average pump power from between 60 and 6 mW. In other words, the average pump power can be controlled by varying the modulation depth of the modulated signal and/or its duty cycle (i.e., the ratio equal to ($T_{on}/(T_{on}+T_{off})$)).

According to a preferred embodiment, the average pump power is adjusted continuously by keeping the modulation frequency (1/T) and depth constant, and by varying the pulse width. This modulation scheme is conveniently referred to as pulse width modulation (PWM) and is particularly effective for producing stable and controllable gain over a broad dynamic range of signal intensity for WDM systems.

Referring again to FIG. 4, the operation of an ROA in accordance with one embodiment of the invention is described. In a first mode of operation, an optical signal requiring significant amplification is launched from the input 42 through the optical fiber 46. Simultaneously, the pump 48, which is operating in a CW mode of operation, provides pump light to the fiber 46. The pump light generates stimulated Raman scattering that provides gain (increased power) to the optical signal. The amplified optical signal is transferred to the output 44. At some point in time, the control system 52 receives a signal (e.g., a feedback signal) indicating that the optical signal requires less amplification. If the required amplification is within the range provided in the first continuous mode of operation, the current is decreased until the required pump power is generated. The current levels are easily found using the relationship between current, pump power, and amplification that is well known to persons skilled in the art. If the amount of amplification is less than that achievable with the first mode of operation, the ROA is switched into a second mode of operation. In the second mode of operation, the optical signal requiring minimal amplification is launched from the input 42 through the optical fiber 46. Simultaneously, the pump 48, which for exemplary purposes is PWM, provides pulsed pump light to the fiber. Notably, the pulse duration is determined by the required amplification. The pulsed pump light generates stimulated Raman scattering that provides gain (increased power) to the optical signal. The amplified optical signal is transferred to the output 44. Since the pulsed pump light is provided at a relatively high frequency, transfer of the pump modulation onto the optical signal is minimized.

Advantageously, the modulation in accordance with the instant invention allows the pump laser to be driven at levels that provide stable coherence collapse, yet also provide less pump power than that achieved with CW operation. In particular, when the modulated pump is driven at levels that are at or near the minimum levels required for stable coherence collapse, a continuous and smooth extension of the dynamic range of the pump and corresponding ROA is provided.

As discussed above, Raman amplifiers are frequently pumped with more than one laser pump to tailor the gain spectrum. For example, in one embodiment a ROA includes three or more pumps, each operating at a different wavelength and in a counter-propagating configuration. In accordance with the instant invention one or more of these laser pumps is optionally operated at power levels below that achievable with CW operation. Advantageously, these low pump power levels are achieved using standard components, thus eliminating the need to create an additional and/or expensive custom pump. When operating two or more laser pumps, the ROA is optionally operated with the modulation of each pump laser phase offset to the other(s).

The instant invention is particularly suited to low power applications of grating stabilized lasers. The invention is not, however, limited to WDM systems, but also extends to low power specifications for single wavelength amplifiers that are frequently are more demanding.

The embodiment(s) of the invention described above is (are) intended to be exemplary only. The scope of the invention is therefore intended to be limited solely by the scope of the appended claims.

What is claimed is:

1. A method of amplifying an optical signal comprising the steps of:
   (a) transmitting the optical signal through a section of optical fiber;
   (b) pumping the optical fiber with a pump signal having a wavelength band and power level sufficient to produce Raman gain within a predetermined band of wavelengths including at least one signal wavelength of the optical signal;
   (c) modulating the pump signal in dependence on a desired average pump signal power;
   wherein step (b) includes driving a grating stabilized laser with a current sufficient to maintain coherence collapse of the laser.

2. A method according to claim 1, wherein the desired average pump signal power is selected to provide constant gain in response to changing signal power of the optical signal.

3. A method according to claim 1, wherein the desired average pump signal power is less than a pump signal power achievable without modulating the pump signal.

4. A method according to claim 1, wherein the step of pumping the optical fiber includes coupling the pump signal into the optical fiber so that it propagates in at least one of a counter-propagating and a co-propagating direction with respect to the optical signal.

5. A method according to claim 1, wherein the step of modulating the pump signal includes pulsing the current at a fixed frequency so as to obtain a desired average current.

6. A method according to claim 5, wherein the fixed frequency is selected so as to minimize a transfer of modulation from the pump signal to the optical signal.

7. A method according to claim 5, wherein the fixed frequency is greater than 500 kHz.

8. A method according to claim 5, wherein the fixed frequency is less than 20 MHz.

9. A method according to claim 5, wherein a pulse width of the pulsed current is selected in dependence upon a desired average current.

10. A method according to claim 5, wherein the pulsed current varies between the current sufficient to maintain coherence collapse of the laser and substantially no current.

11. A method according to claim 1, wherein the step of modulating the pump signal comprises pulse width modulation to produce the desired average pump signal power.

12. A method of pumping an optical amplifier having a section of optical fiber for receiving and amplifying an optical signal, the method comprising the steps of:
  providing a grating stabilized pump laser for providing a pump signal to the optical fiber, the pump signal having a wavelength band and power level sufficient to produce Raman gain on the optical signal;
  determining a drive current $I_{max}$ of the pump laser for maximum pump power output;
  determining a drive current $I_{min}$ of the pump laser for minimum stable pump power output;
  applying a pulsed drive current to the pump laser at least at $I_{min}$ for providing a time averaged pump drive current $I_{ave}$ less than $I_{min}$ while still maintaining stable pump power output; and
  modifying the pulsed drive current in dependence upon a desired pump power level.

13. A method according to claim 12, wherein the step of modifying the pulsed drive current includes changing a pulse width of the pulsed drive current to effect a substantially linear decrease in time averaged pump drive current.

14. A Raman optical amplifier comprising:
  a section of optical fiber for transmitting an optical signal;
  a grating stabilized pump laser optically coupled to the length of optical fiber, the pump laser for providing a pump signal having a wavelength band and power level sufficient to produce Raman gain within a predetermined band of wavelengths including at least one signal wavelength of the optical signal; and,
  modulating means coupled to the pump laser, the modulating means for modulating the pump signal in dependence on a desired average pump signal power.

15. An amplifier as defined in claim 14, wherein the Raman amplifier comprises a distributed Raman amplifier.

16. An amplifier as defined in claim 14, wherein the Raman amplifier comprises a discrete Raman amplifier.

17. An amplifier as defined in claim 14, wherein the pump laser is coupled to the optical fiber with a WDM coupler.

18. An amplifier as defined in claim 14, wherein the pump laser is coupled to the optical fiber so as to provide a pump signal counter-propagating with the optical signal.

19. An amplifier as defined in claim 14, wherein the pump laser is coupled to the optical fiber so as to provide a pump signal co-propagating with the optical signal.

20. An amplifier as defined in claim 14, wherein the modulating means comprises a power supply coupled to the pump laser, the power supply for providing selectably variable current to the pump laser between a current level of $I_{max}$ and $I_{min}$, where $I_{min}$ corresponds to minimum stable operating current of the pump laser.

21. An amplifier as defined in claim 20, wherein the power supply is designed for providing pulsed current at a fixed frequency.

22. An amplifier as defined in claim 21, further comprising a controller for varying the pulse duty cycle in order to provide selectable average current below $I_{min}$.

23. An amplifier as defined in claim 14, wherein the modulating means comprises a power supply for driving the pump laser such that the pump signal is pulsed at a fixed frequency.

24. An amplifier as defined in claim 23, comprising a controller for varying the pulse width so as to increase the dynamic range of the pump laser.

25. An amplifier as defined in claim 14, further comprising at least one other pump laser coupled to the optical fiber.

26. An amplifier as defined in claim 25, wherein the modulating means is designed such that each of the pump laser and the at least one other pump laser is modulated with its phase offset with respect to the other.

27. A Raman pump for pumping a section of optical fiber for transmitting an optical signal, comprising:
  a grating stabilized pump laser optically coupled to the section of optical fiber, the pump laser for providing a pulsed pump signal having a wavelength band and an average power level sufficient to produce-Raman gain for the optical signal; and,
  a controller coupled to the pump laser, the controller for selecting a pulse width of the pulsed pump signal so as to increase the dynamic range of the pump laser.

28. A Raman optical amplifier comprising:
  a pump laser for optically coupling to a length of optical fiber, the pump laser for operating in a first continuous-wave mode of operation wherein it produces a continuous wave pump signal having a power level between $P_{max}$ and $P_{min}$, and a second modulated mode of operation wherein it produces a modulated pump signal having an average power level below $P_{min}$, wherein $P_{min}$ corresponds to the minimum pump power achievable under stable continuous wave operating conditions; and
  a controller coupled to the pump laser, the controller for switching between the first and second modes of operation in dependence upon a desired pump power.

* * * * *